United States Patent Office 3,711,415
Patented Jan. 16, 1973

3,711,415
CHEMILUMINESCENT REACTION OF SUBSTITUTED VINYLENE CARBONATES WITH HYDROGEN PEROXIDE IN THE PRESENCE OF A FLUORESCER
Donald Roy Maulding, Branchburg Township, Somerset County, N.J., assignor to American Cyanamid Company, Stamford, Conn.
No Drawing. Filed Jan. 27, 1971, Ser. No. 110,297
Int. Cl. C01k 3/00
U.S. Cl. 252—188.3                             8 Claims

ABSTRACT OF THE DISCLOSURE

Novel compositions of matter and reactions for the direct generation of light from chemical energy employing such compositions. By "light" is meant electromagnetic radiation at wavelengths falling between about 350 m$\mu$ and 1000 m$\mu$.

---

The invention herein described was made in the course of or under a contract with the Department of the Navy.

The present invention relates to novel compositions of matter and to reactions for the direct generation of light from chemical energy employing such compositions. By "light" as referred to herein is meant electromagnetic radiation at wavelengths falling between about 350 m$\mu$ and 1000 m$\mu$.

The art of generating light from chemical energy, i.e., chemiluminescence, is continually in search of compositions which when reacted substantially improve the intensity and lifetime of light emission as contrasted to known chemiluminescent compositions and reactions. Obviously, improved compositions are constantly in demand for use as signal devices, for area illumination, etc.

Various compounds have been known and proposed in the past for obtaining chemiluminescent light. One group is based on the compound tetra-methylamino-ethylene, reactive with oxygen. Such compounds must obviously be protected from air during storage.

Another group of compounds are derivatives of bis-aryl or heterocyclic derivatives of oxalic acid. These compounds react with a peroxide in the presence of a solvent and a fluorescent compound to give chemiluminescent light. Although these oxalates are the best known chemiluminescent systems, they have the disadvantage that the oxalates are relatively expensive to prepare and are also relatively insoluble, thus limiting the amount of light obtainable from a given volume of solution.

It is an object of this invention to obtain a chemiluminescent composition and a process employing said composition whereby a high efficiency may be obtained in the conversion of chemical energy into light.

Another object is to obtain a chemiluminescent compound which produces light over an extended period of time.

Another object of this invention is to obtain a chemiluminescent composition which attains light of substantially higher intensity than has been obtained with former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

The term "chemiluminescent reactant," as used herein, means (1) a mixture which will result in a chemiluminescent reaction when reacted with other necessary reactants in the processes as disclosed herein, or (2) a chemiluminescent composition.

The term "fluorescent compound," as used herein, means a compound which fluoresces in a chemiluminescent reaction, or a compound which produces a fluorescent compound in a chemiluminescent reaction.

The term "chemiluminescent composition," as used herein, means a mixture which will result in chemiluminescence.

The term "admixing," as used herein, means "reacting" or sufficiently bringing together component reactants to obtain a chemiluminescent reaction.

The term "hydroperoxide compound" as used herein is limited to peroxide compounds having at least one "HOO—" group, or a compound which upon reaction produces a compound with such a group.

The term "peroxidic groups," as used herein, represents "HOO—", "ROO—", or

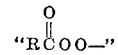

where R is an organic substituent, such as alkyl, cycloalkyl, $\alpha$-hydroxyalkyl, substituted alkyl, for example.

The term "diluent," as used herein, means a solvent or a vehicle which when employed with a solvent does not cause insolubility.

The term "peroxide compound," as used herein, also includes compounds which upon reaction produce the peroxide group.

The term "hydrogen peroxide compound" includes (1) hydrogen peroxide and (2) hydrogen peroxide-producing compounds.

I have now found a new class of compounds which react with a peroxide in the presence of a solvent and a fluorescer to give chemiluminescent light.

These compounds are vinylene carbonates having the general structural formula:

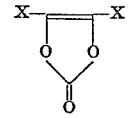

1. X=halo of the group Cl, Br, F
2. X=OR, where R=alkyl, cycloalkyl, aryl, and substituted aryl, with substituents such as nitro, cyano, chloro, bromo, fluoro, perfluoroalkyl, acyl, alkyl and aryl-sulfonyl, and alkyl and arylcarboxy
3. X=—NR$_2$, where R=alkyl or aryl
4. X=—SR, where R=alkyl or aryl
5. X=—CN, —NO$_2$, —CO$_2$R with 30% hydrogen peroxide provides a superior chemiluminescent system. With such fluorescers as 9,10-diphenylanthracene, perylene, 9,10 - bis(phenylethynyl) anthracene and 5,12-bis(phenylethynyl)naphthacene, blue to red emission is produced.

The hydroperoxide employed in the compositions and process of this invention may be obtained from any suitable peroxide compound. For example, the hydroperoxide may be employed as sodium peroxide. Alternatively, sodium perborate may be placed in aqueous solution whereby a solution of hydrogen peroxide is obtained. Obviously, hydrogen peroxide or its solution may be employed. The peroxide employed may be obtained from anhydrous hydrogen peroxide compounds such as perhydrate of urea (urea peroxide), perhydrate of pyrophosphate (sodium pyrophosphate peroxide), perhydrate of histidine (histidine peroxide), sodium perborate, and the like. Still another form in which the $H_2O_2$ may be provided in the composition is that of an anhydrous solution of $H_2O_2$ in a suitable solvent such as an ether, an ester, an aromatic hydrocarbon, etc. of the type which would provide a suitable diluent for the composition of this invention. Alternatively, the hydroperoxide employed in the composition or process could be any compound having a hydroperoxidic group, such as a hydroperoxide (ROOH) or a peroxy acid

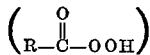

such as t-butyl hydroperoxide and perbenzoic acid. Whenever hydrogen peroxide is contemplated to be employed, any suitable compound may be substituted which will produce hydrogen peroxide.

The hydroperoxide concentration may range from about 15 molar down to about $10^{-5}$, preferably about 2 molar down to about $10^{-4}$ molar. The chlorinated ethylene carbonate of this invention may be added as a solid or in admixture with a suitable solid peroxide reactant or in a suitable diluent, or alternatively dissolved directly in a solution containing the peroxide reactant.

Broadly, diluents within the purview of the instant discovery are those that do not readily react with a peroxide such as hydrogen peroxide, and which do not readily react with the ethylene carbonates.

Although the addition of water is not necessary for the production of chemiluminescent light in certain embodiments according to the present invention, water can serve as the diluent or partial diluent. The term "water," as used herein, includes water-producing compounds such as hydrates. In addition, however, either one or more diluents may be included with or in the place of the water, as long as the peroxide employed is at least partially soluble in the diluent(s), such as, for example, at least one gram of $H_2O_2$ per liter of diluent. The following are illustrative of the additional diluents or solvents which may be employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like.

The fluorescent compounds contemplated herein are numerous; and they may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 1000 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chloro, bromo, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence," by Peter Pringsheim, Interscience Publishers, Inc. New York, N.Y., 1949. Other fluorescers are described in "The Colour Index," Second Edition, Volume 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release.

It has been found that molar (moles per liter of diluent) concentrations of the major components of the novel composition herein described may vary considerably. It is only necessary that components be in sufficient concentration to obtain chemiluminescence. The vinylene carbonate molar concentration normally is in the range of at least about $10^{-7}$ to 5 molar, preferably in the range of at least about $10^{-4}$ to about 1 molar; the fluorescent compound is present in the range from about $10^{-5}$ to 5, preferably $10^{-4}$ to $10^{-1}$; and the water or other diluent must be present in a sufficient amount to form at least a partial solution of the reactants involved in the chemiluminescent reaction. There is no known maximum limit on the concentration of vinylene carbonate employed in the reaction. The ester may serve as either the sole diluent or a partial diluent.

The ingredients of the composition of this invention, may be admixed in a single stage of admixing or in a sequence of steps of admixing the separate ingredients. Accordingly, alternative compositions may be prepared which may be stored over a period of time and which may be admixed with the final ingredient at a time when the chemiluminescent lighting is desired. For example, one such composition would be a composition which includes a vinylene carbonate and a fluorescent compound but which does not include a peroxide compound. Another alternative composition would be a composition which includes the fluorescent compound and a peroxide, but which does not include the vinylene carbonate. Another alternative composition would be a solid composition which includes a solid vinylene carbonate and a solid hydroperoxide compound, and possibly additionally includes a solid fluorescent compound, but which does not include a diluent. Obviously the preferred compositions which would be less than all necessary components to produce a chemiluminescent light would be a composition which would be substantially stable to a practical degree over an extended period of time; otherwise, there would be no real advantage in forming a chemiluminescent reactant to be employed in a subsequent chemiluminescent reaction.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Although in the process of obtaining chemiluminescent light according to this invention, it is normally not necessary to employ a specific order of sequence of steps in the adding of the individual ingredients of the inventive chemiluminescent composition, it has been found that the fluorescent component preferably should be already in the reaction mixture at the time of addition of the last component necessary to bring about the chemical reaction and the concurrent release of chemical energy.

Additionally, it has been found that the superior intensity of chemiluminescence is obtained when the final mixture producing the luminescence is maintained at a temperature of between about $-40°$ C. and $75°$ C., preferably between about $20°$ C. and $50°$ C.; however, the luminescence of applicant's process is not limited to these ranges. However, temperature is not critical.

Additionally, the composition and the process which obtains preferred optimum chemiluminescent light intensity employs a base in an amount sufficient to produce a basic pH. However, the preferred extended lifetime is obtained under about neutral conditions. Any suitable base which does not interfere with the chemiluminescent composition and process of this invention may be employed.

A wide variety of organic and inorganic bases is contemplated, typical bases being: sodium hydroxide, potassium hydroxide, potassium tertiary butoxide, sodium ethoxide, sodium methoxide, ammonium hydroxide, tetrabutyl ammonium hydroxide, and triphenyl methide; Lewis bases, including pyridine, triethylamine, quinoline, and the like, etc.

The lifetime and the intensity of the chemiluminescent light can be regulated by the use of certain regulators such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of regulation.

(3) By the addition of water.

The following examples are intended to illustrate the present invention and are in no way intended to limit the invention except as limited in the appended claims.

EXAMPLE I

Dichlorovinylene carbonate preparation

A solution of 6.78 g. (0.03 mole) of tetrachloroethylene carbonate and 30 ml. of diethyl ether was refluxed in the presence of zinc-copper couple [1] for 12 hours. The mixture was filtered, the filtrate was evaporated and the remaining oil was distilled at 55°/28 mm. [lit.[2] 39–40°/10 mm.] to yield 1.7 g. (37%) of dichlorovinylene carbonate; IR, 1980 cm.$^{-1}$.

EXAMPLE II

In this example, the dichlorovinylene carbonate prepared according to Example I was used in a chemiluminescent composition and reaction. The varying conditions and results are shown in Table I which illustrates qualitative experiments.

TABLE I.—QUALITATIVE CHEMILUMINESCENCE EXPERIMENTS WITH DICHLOROVINYLENE CARBONATE

| Carbonate conc. (M)[a] | Solvent[b] | $H_2O_2$ conc. | Max. intensity (ft. lbts. cm.$^{-1}$) | Lifetime (min.) |
|---|---|---|---|---|
| 0.13 | DBP–30% aq. $H_2O_2$ (3:1) | | 10–12 | 180–200 |
| 0.13 | EA–30% aq. $H_2O_2$ (3:1) | | 10–12 | 30 |
| 0.20 | DBP–MP (3:1) | 0.5 | 15–18 | 5 |
| 0.20 | DBP–EC (3:1) | 0.5 | 20–22 | 10 |

[a] Experiments run at 25° C. Solvent for dichlorovinylene carbonate was dibutyl phthalate (DBP). Concentration of 9,10-bis(phenylethynyl)-anthracene was 0.0025 M.
[b] EA=ethyl acetate; MP=3-methyl-3-pentanol; EC=ethyl Cellosolve.

EXAMPLE III

In this example, the dichlorovinylene carbonate prepared in Example I was used in a chemiluminescent composition and reaction. The conditions and results of quantitative evaluation are shown in Table II.

TABLE II

Quantitative chemiluminescence experiments with dichlorovinyl carbonate [a]

Max. intensity (ft. lbts. cm.$^{-1}$) _____ 2.2
Quantum yield [b] (ein. mole$^{-1}$ 10$^2$) _____ 3.4
Light capacities [c] (1 m. hr./l.) _____ 31.5
Time [d], $t\frac{3}{4}$ (min.) _____ 93.7

[a] Experiment run at 25°. Concentrations were: dichlorovinylene carbonate=0.03 M. 910-bis(phenylethynyl) anthracene=0.0025 M in (three parts/one part by volume) dibutyl phthalate–30% aqueous hydrogen peroxide.
[b] Quantum yield based on dichlorovinylene carbonate concentration.
[c] Integrated light output per unit volume.
[d] Time required for emission of 75% of total light.

What is claimed is:

1. A chemiluminescent composition intended to be reacted with a hydroperoxide to provide chemiluminescent light comprising as ingredients a vinylene carbonate compound of the formula:

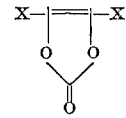

wherein X represents a substituent selected from the groups consisting of halo-, said halo- being selected from the groups consisting of chloro-, bromo- and fluoro-; —OR, where R is alkyl, cycloalkyl, aryl and aryl substituted by nitro, cyano, chloro, bromo, fluoro, perfluoroalkyl, acyl, alkyl, aryl, sulfonyl, alkylcarboxy and arylcarboxy; —NR$_2$, where R is alkyl and aryl; —SR$_2$, where R is alkyl and aryl; —CN; —NO$_2$ and —CO$_2$R and an organic fluorescent compound and an organic solvent, capable of dissolving said other ingredients, said other ingredients being present in such ratios as to provide visible chemiluminescent light.

2. The composition of claim 1 wherein said halo- is chloro-.

3. The composition of claim 1 wherein said peroxide is hydrogen peroxide.

4. The composition of claim 1 wherein said fluorescent compound is 9,10-bis(phenylethynyl)anthracene.

5. The composition of claim 1 wherein said solvent is at least one organic solvent.

6. The composition of claim 1 wherein said solvent is a mixture of organic solvents.

7. The composition of claim 1 wherein said hydrogen peroxide is in the form of an aqueous solution.

8. A composition as in claim 1 wherein said vinylene carbonate compound is ethylene carbonate and said hydroperoxide is hydrogen peroxide.

References Cited

UNITED STATES PATENTS 3,442,813    5/1969    Bollyky _____ 252—188.3

JOHN D. WELSH, Primary Examiner

U.S. Cl. X.R.

252—186

---

[1] R. S. Shank and H. Shechter, J. Org. Chem., 24, 1825 (1959).
[2] H. Scharf, W. Droste and R. Liebig, Angew Chem., Int. Ed., 7, 215 (1968).